Figure 1:
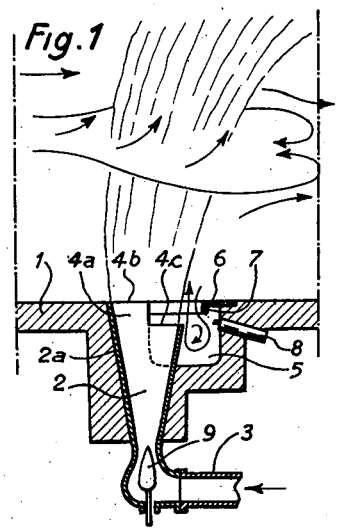

Jan. 22, 1963    O. FRENZL    3,074,668
BURNER FOR HOT FUEL
Filed Dec. 8, 1959    4 Sheets-Sheet 1

INVENTOR
Otto Frenzl

By
Watson, Cole, Grindle & Watson
ATTORNEYS

Jan. 22, 1963     O. FRENZL     3,074,668
BURNER FOR HOT FUEL
Filed Dec. 8, 1959                                                 4 Sheets-Sheet 3
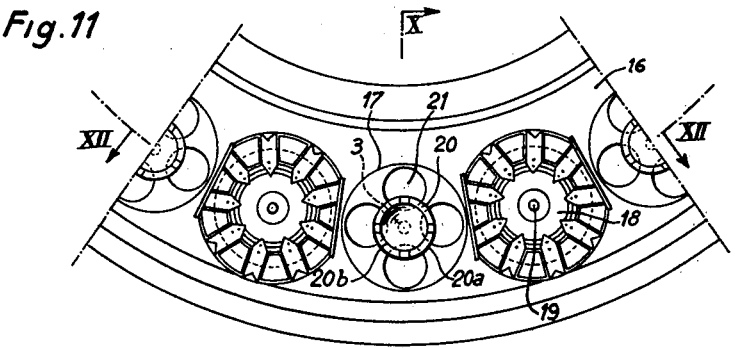
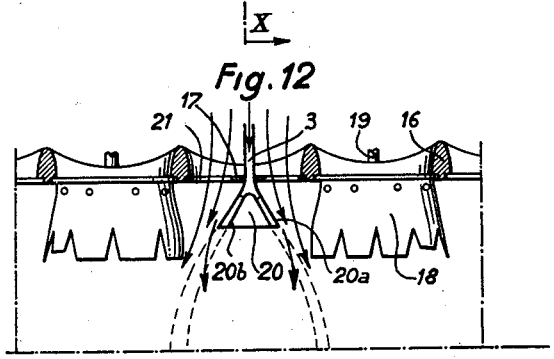
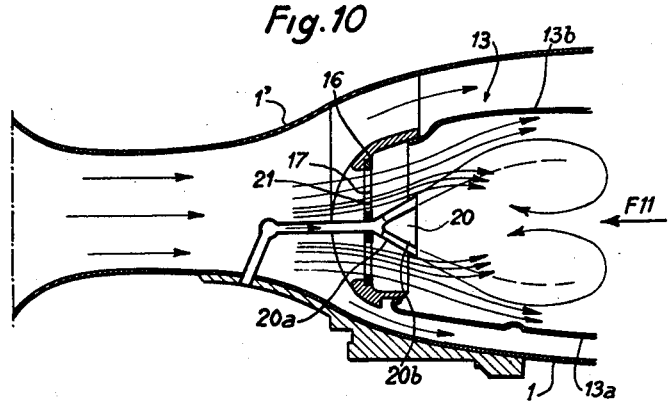
INVENTOR
Otto Frenzl
by Watson, Cole, Grindle & Watson
ATTORNEYS United States Patent Office 3,074,668
Patented Jan. 22, 1963

3,074,668
BURNER FOR HOT FUEL
Otto Frenzl, Dammarie les Lys, France, assignor to Société Nationale d'Etude et de Construction de Moteurs d'Aviation, Paris, France, a company of France
Filed Dec. 8, 1959, Ser. No. 858,115
Claims priority, application France Dec. 10, 1958
13 Claims. (Cl. 244—53)

Certain parts of the engines of aircraft are generally cooled by circulating air directly or indirectly by means of a radiator. However, in the case of aircraft flying at very high supersonic speeds, the air is subjected to kinetic heating and can no longer be used as a cooling agent. It has therefore been proposed to cool some parts of the engine by means of the fuel itself which is provided for supplying the engine.

Moreover, heating due to the friction of the air at high mach numbers reduces the resistance of the material constituting the skin of the aircraft, or produces supplementary thermal stresses. In order to avoid these phenomena, it would be possible to provide external heat-insulation, but it seems preferable to cool the skin. Cooling has the advantage of keeping the boundary layer longer in a laminar state, which considerably reduces the drag on the aircraft, improving the efficiency of the machine and therefore increasing its radius of action. It has been found that at Mach 3, the frictional resistance is reduced by about 50%, which produces a reduction in the total drag of about 25%. The cooling of the aircraft skin can also be effected by means of the fuel supplying the engine.

In order that the fuel can absorb large quantities of heat without causing the formation of vapour within the interior of the cooling system, the pressure of the fuel must be very high. The present invention, which relates to a burner for hot fuel whilst being applicable whatever the origin of the heat utilised in order to heat the fuel, permits, more particularly, rational utilisation of the hot fuel under pressure which has been used for cooling the engine or another part of the aircraft.

According to the invention, the hot fuel is partially vaporised with formation of a more or less penetrating jet, by expansion in a nozzle preferably of the convergent-divergent type opening either into a combustion or post-combustion chamber within the aircraft, or outside the aircraft, where combustion occurs.

According to one particular form of embodiment of the invention which is particularly suitable for a post-combustion chamber, the nozzle is placed in the wall of the chamber itself, perpendicularly thereto, so that the jet of fuel issuing from the said nozzle forms a fluid screen, the combustion being used, in a sense, as a shield for itself.

However, the nozzle may also be directed in counter-current to the main gaseous flow or can be inclined with respect to said flow with any desired angle.

The following description with regard to the accompanying drawings which are given by way of non-limitative example, will make it easy to understand the various features of the invention and the way in which they are carried out, any feature brought out from the text or from the figures being understood to come within the scope of the present invention.

FIG. 1 is a sectional view of part of a combustion or post-combustion chamber equipped with a nozzle which produces a penetrating jet.

Figure 3:
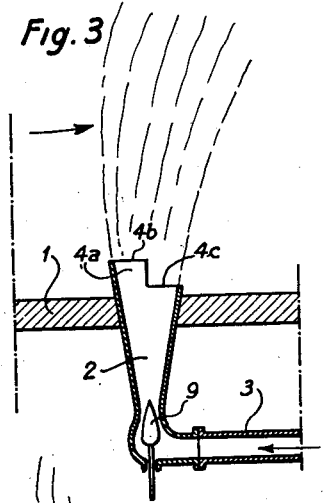
Figure 4:
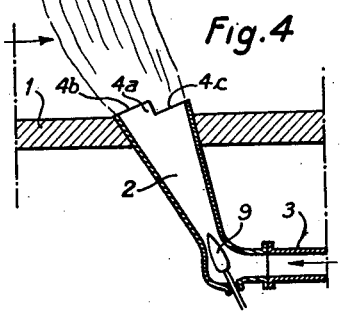
Figure 2:
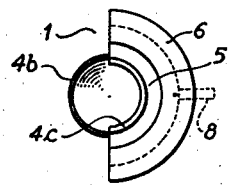
Figure 5:
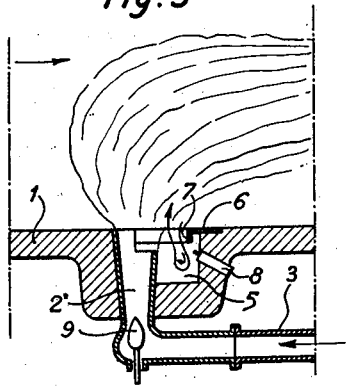
Figure 6:
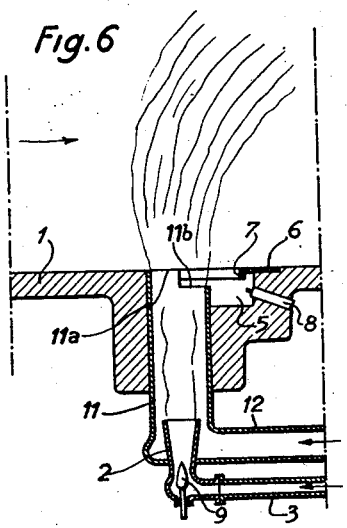
Figure 7:
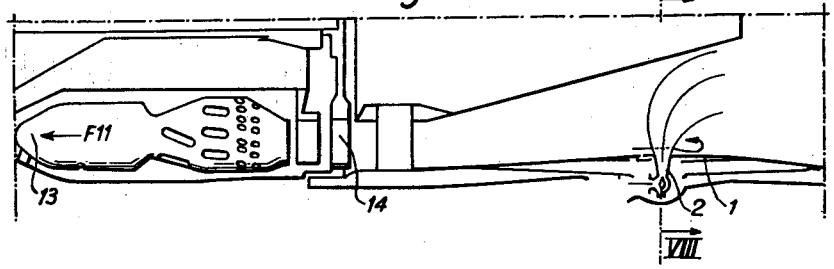
Figure 8:
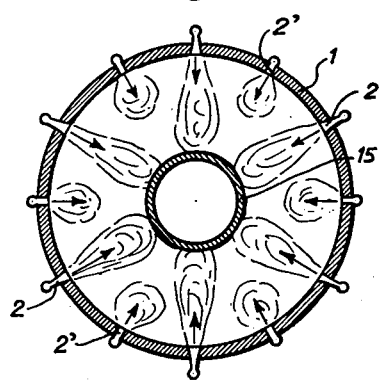
Figure 9:
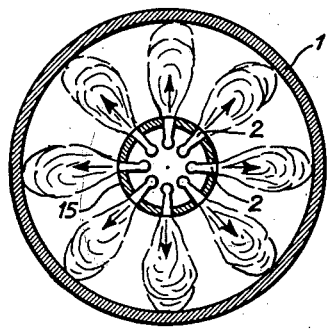
Figure 13:
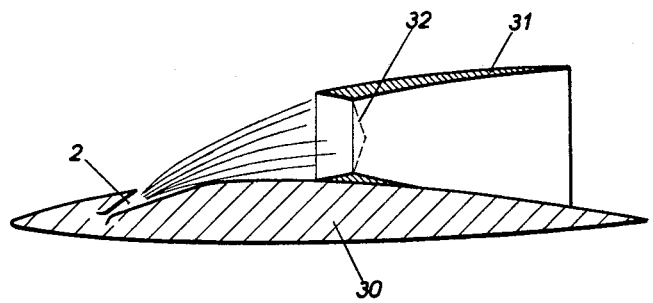
Figure 14:
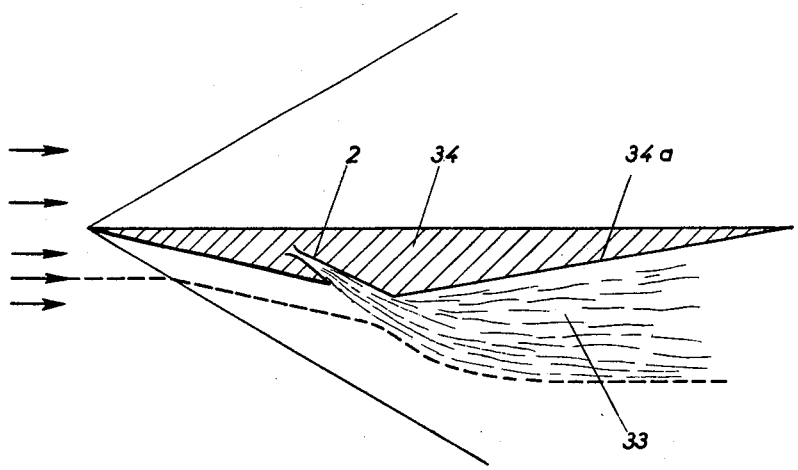

FIG. 2 is a plan view of the device according to FIG. 1.
FIG. 3 is a modified form of embodiment of FIG. 1.
FIG. 4 is a modified form of embodiment in which the axis of the nozzle is inclined in counter-current.
FIG. 5 is a view similar to FIG. 1, the nozzle being less divergent (or even cylindrical) so as to produce a short wide jet.
FIG. 6 shows the combination of a nozzle with an ejector for the aspiration of primary air.
FIG. 7 is a longitudinal half-section of the central portion of a turbo-jet engine showing a combustion chamber and a post-combustion chamber equipped with nozzles producing jets directed radially from the exterior towards the interior.
FIG. 8 is a sectional view thereof taken on VIII—VIII of FIG. 7.
FIG. 9 is similar to FIG. 8 but showing a modified form of embodiment according to which the nozzles are situated in a central body concentric with the chamber.
FIG. 10 is a partial longitudinal sectional view taken on X—X of the annular combustion chamber of FIG. 11, this section is taken on the axis of a burner according to the invention.
FIG. 11 is a partial view on F11 of the burners of this chamber (see FIGS. 7 and 10).
FIG. 12 is a developed section taken on XII—XII of the chamber shown in FIG. 11.
FIG. 13 is a very diagrammatic view showing the application of the invention to an aircraft equipped with a ramjet engine.
FIG. 14 is a very diagrammatic view showing the invention applied to an external combustion under a triangular wing.

FIG. 1 shows a portion of a combustion or post-combustion chamber of a propulsion unit for an aircraft. Through this chamber a gaseous flow travels at a high speed from the left towards the right of the drawing. Situated in the wall 1 of this chamber is a convergent-divergent nozzle 2 connected to a duct 3 by means of which the hot fuel under pressure arrives, for example having travelled through a cooling circuit for cooling the engine or the skin of the aircraft. The divergent portion 2a of the nozzle is cut away over a semi-circular area and the corresponding end is withdrawn from the mouth of the nozzle so that the upstream part 4a of the divergent portion finishes flush with the wall 1 of the chamber along a semi-circle 4b, whereas the downstream part is in the form of a semi-circle 4c situated at a level below the inner face of the chamber. The wall 1 of the chamber is provided with a recess 5 surrounding the downstream part of the divergent portion along a semi-circle (FIG. 2). A plate 6 in the form of half of a circular ring is fixed to the wall of the chamber and projects in overhanging fashion over the recess 5. This plate is also bent-over through 90° at 7 towards the interior of the recess. An appropriate ignition means, for example a sparking plug 8, is situated in the recess 5. Finally, a needle valve 9, for example, makes it possible to regulate the cross-section allowed for the passage of the fuel through the throat of the nozzle.

When the fuel, subjected to a strong pressure and circulated by means of a pump, has travelled through the parts to cool and thus has accumulated a considerable quantity of heat, it arrives through the ducts 3 and flows into the nozzle 2. There, the fuel acquires a very high speed, whilst its pressure diminishes. The pressure drop along the divergent portion produces a partial vaporisation of the fuel, the residual quantity of liquid being finely atomised during the vaporisation. It is to be noted that the atomisation, vaporisation and speed energy comes in practice from the thermal energy acquired by the fuel in contact with the hot parts. The increase of enthalpy in the fuel due to the pump situated in the cooling circuit is very slight and corresponds to only about 5% of that which is due to thermal causes. At the outlet from the divergent portion, part of the fuel debouching at the end 4c which is offset relatively to the portion 4a spreads out downstream in the recess 5 where it is ignited by means of the sparking plug 8; the combustion is then stabilized in a zone which is sheltered from the main gaseous flow, within the recess, under the plate 6 with the bent-over edge.

The divergent portion of the nozzle is so shaped that the pressure at the outlet is substantially equal to that prevailing in the chamber, so that the fuel enters the chamber at a very high speed. Furthermore, the fuel has a high density due to the considerable content of liquid particles. The fuel penetrates, therefore, in the form of a jet having a considerable penetrating force and capable of being used as a flame-attaching means for a main combustion process taking place in the shelter of the fluid screens formed by the jets.

It will be seen that an arrangement of this kind is particularly advantageous in the case of a post-combustion chamber. It is known in fact that in a chamber of this kind the burners operate only during a relatively short time relatively to the total time during which the propulsion unit is used. With the burners according to the invention, when the post-combustion is not being used, no projecting part likely to produce a drag effect exists within the chamber.

In combustion chambers proper, used all the time that an aircraft is in flight, this condition is not indispensable and it is possible to allow a slight material obstacle which is constantly projecting into the interior of the chamber. This is what is shown in FIG. 3, which shows a burner of similar construction. In this figure, the nozzle 2 for injecting hot fuel projects partly into the interior of the combustion chamber. The divergent portion of the nozzle comprises, as previously, an upstream projecting part 4a terminating in a semi-circle 4b and a downstream part terminating in a semi-circle 4c, offset relatively to the level of the section 4b. In the dead zone in the shelter of the projecting part 4a there is situated an ignition device which is not shown in the drawing and the effects obtained are similar to those observed in the recess 5.

The nozzle 2 can even be inclined upstream in relation to the general direction of flow of the main body of fluid within the chamber (FIG. 4), and thus injection is effected partly in counter-current and combustion can also be protested in the dead zone in the shelter of the projecting part 4a of the nozzle.

The injection nozzle could also be entirely directed in counter-current, which would have the advantage of shortening the combustion chamber. In this case, the jet coming from the nozzles and the incident flow form as a result of their encounter a mushroom-shaped screen behind which the flame is sheltered.

The form of embodiment illustrated in FIG. 5 is similar to that shown in FIG. 1 and is therefore particularly suitable for a post-combustion chamber. The nozzle 2' is less divergent than previously and could even be cylindrical, so that the pressure at the outlet is much higher than the pressure within the chamber. The jet bursts out into the chamber. The speed of the fuel is lower and the penetrating force is reduced. The jet at the outlet of the nozzle is therefore short and wide as shown in the figure.

According to the form of embodiment shown in FIG. 6, the nozzle 2 is supplied with hot fuel under pressure through the duct 3 and, associated with a substantially cylindrical pipe 11 aspirates air from a duct 12. The nozzle 2 can be regulated, if necessary, by a needle valve 9 and is situated substantially at the inlet of the pipe 11. The part 11a of that pipe 11 finishes flush with the inner surface of the chamber and the other part 11b is rearwardly positioned.

The fuel, which has been given a high speed, produces an air aspirating effect in the substantially cylindrical pipe as it escapes from the nozzle 2. The mixture which flows out of the pipe 11 is ignited by the sparking plug 8 in the recess 5. Thus there is obtained at the outlet of the nozzle better combustion conditions. In fact, the aspiration of the air by the fuel issuing from the induction-ejector so formed gives a mixture more inflammable and a larger surface of contact with the flow of incident air in the combustion chamber and acts as a larger flame-holder.

FIG. 7 is a longitudinal half-section of the central portion of a turbo-jet engine showing an annular combustion chamber 13 and a post-combustion chamber following the turbine 14. The fuel is injected radially into the post-combustion chamber from the exterior towards the interior, through nozzles 2 producing jets having a considerable penetrating force.

FIG. 8 shows these nozzles 2 uniformly distributed in the wall 1 of the chamber, six such nozzles, for example, being provided. The nozzles 2 are associated with nozzles 2' uniformly distributed between the nozzles 2 and producing short, wide jets. In this way the fuel is effectively distributed throughout the entire cross-section of the chamber.

In FIG. 9, which is a cross-sectional view similar to FIG. 8, injection is effected radially from the interior towards the exterior through the identical nozzles 2 situated in the wall 15 of a central body co-axial with the chamber, which can be, for example, the inner cone situated in the ejection cone following the turbine 14. These nozzles produce penetrating jets and here again effective distribution of the fuel throughout the entire cross-section of the nozzle is obtained.

A nozzle for vaporisation of hot fuel can also be situated parallel to the main air flow in a combustion chamber. This is what is shown in FIGS. 10 to 12 which show a partial view of a burner-carrying ring 16 situated at the inlet of the annular combustion chamber 13 constituted by an outer wall 13a and an inner wall 13b and situated between an outer envelope 1 and an inner envelope 1'. Arranged in this ring are burners according to the invention, such as 20, and conventional burners such as 18, uniformly distributed over the circumference of said ring; these latter burners comprise ordinary injectors 19, so as to permit normal operation with cold fuel which is all that is available at the time of start-up.

The injector forming part of the burner 20 according to the invention is a double cone. The walls 20a and 20b are so shaped that the space which they bound between them has a cross-section which first of all decreases and then increases, so as to produce the appropriate pressure and speed at the outlet as in the preceding nozzles 2. The hot fuel arrives at 3, issuers at high speed from the injectors and burns in the return zone of each of them with the primary air which is admitted into the chamber through orifices 21 formed in the wall 17 of the burners 20. The combustion flow mixes downstream with the portion of primary air passing between the arms of the normal burners 18. In known manner, the secondary air flows between the outer walls 1 and 13a and the inner walls 1' and 13b.

Of course, the various nozzles which have been described can be combined within one and the same combustion chamber. Thus, for example, it would be possible to arrange downstream of the burners 20 or the normal burners situated at the inlet to the chamber, nozzles 2 or 2' distributed as illustrated in FIGS. 7 and 8. More particularly, the nozzles can be so arranged as to obtain a determinate temperature distribution at the turbine.

Finally, it is possible to direct the nozzles of the burners according to the invention in the outer flow of the aircraft.

According to the form of embodiment shown in FIG. 13, an aircraft 30 comprises a ram jet engine 31 capable of supersonic operation. Upstream of the latter there are arranged nozzles 2 of one of the types previously described, these being directed in the outer flow towards the said ram-jet engine. The hot fuel which is partially vaporised by expansion as it issues from the nozzle 2 forms a supersonic flow which mixes with the supersonic-speed external air flow, with shock wave attached, designated as 32. Combustion within the ram-jet engine is effected by detonation wave.

In the form of embodiment according to FIG. 14, the nozzles 2 open into a sort of combustion chamber 33 of an external ram-jet propulsion unit bounded only by the lower face 34a of a triangular wing 34. The supersonic flow of partially vaporised fuel open issuing from the nozzles 2 is mixed with the air flow and the combustion which is produced in the kind of chamber 33 externally of the aircraft increases the pressure on the face 34a of the wing, which results in an increase of the lift and the thrust.

What is claimed is:

1. Burner for a combustion chamber through which a gaseous flow travels at high speed, comprising a nozzle, one pipe connected to said nozzle and supplied with hot liquid fuel under pressure, said nozzle having a divergent part of substantial length with a divergence of a predetermined value opening into said chamber, the said hot liquid fuel having a pressure above a level which permits the fuel to be vaporized in the said pipe and below a level which permits at least a part of the same to be vaporized by expansion in the said divergent part of predetermined divergence while flowing therethrough, whereby the hot liquid fuel under pressure is vaporized in said divergent part at least partially by expansion with formation of a jet which penetrates to a more or less considerable distance into said gaseous flow according to said predetermined value of said divergence.

2. Burner according to claim 1, in which said nozzle has a free edge opening into said chamber, said free edge comprising a cutaway which determines an upstream side and a downstream side on said edge with respect to the gaseous flow in said chamber, whereby said upstream side protrudes into said chamber to a greater extent than said downstream side of said edge.

3. Burner according to claim 2 wherein said nozzle is inclined upstream with respect to said gaseous flow in said chamber.

4. Burner according to claim 1, for a combustion chamber bounded by a wall with an inner surface through which said gaseous flow travels, wherein said nozzle is accommodated in said wall, said nozzle having a divergent portion with a free edge opening into said chamber, said free edge comprising a cutaway which determines an upstream part and a downstream part on said edge with respect to the gaseous flow in said chamber, wherein said upstream part is in line with the inner surface of said wall while said downstream part is set back with respect to said inner surface.

5. Burner according to claim 4 wherein a recess arranged in the wall of said chamber surrounds said downstream part of said nozzle, an ignition means being situated in said recess.

6. Burner according to claim 5 wherein a plate overhangs said recess surrounding said downstream side of the nozzle.

7. Burner according to claim 1, for a combustion chamber bounded by a wall with an inner surface through which said gaseous flow travels, wherein a cylindrical pipe is accommodated in said wall, said pipe opening into said chamber and surrounding at least partially said nozzle to form therewith an ejector pump aspirating air, said pipe having a free edge with a cutaway which determines an upstream part and a downstream part on said edge with respect to the gaseous flow in said chamber, wherein said upstream part is in line with said inner surface of said wall while said downstream part is set back with respect to said inner surface.

8. Burner according to claim 7 wherein a recess arranged in the wall of said chamber surrounds said downstream part of said pipe, an ignition means being located in said recess.

9. Burner according to claim 8 wherein a plate overhangs said recess surrounding said downstream part of the pipe.

10. Burner according to claim 1 for a combustion chamber comprising a central body, wherein said nozzle is accommodated in said central body.

11. Burner for a combustion chamber through which a gaseous flow travels at high speed, comprising a first cone, a pipe connected to the apex of said cone and supplied with hot liquid fuel under pressure, and a second cone inside said first cone and coaxial therewith, whereby a divergent passage is formed between said cones, the said hot liquid fuel having a pressure above a level which permits the fuel to be vaporized in the said pipe and below a level which permits the same to be vaporized by expansion in said divergent passage while flowing therethrough.

12. In an aircraft, the combination of a ram-jet engine capable of supersonic operation attached to the aircraft, and at least one burner arranged upstream of the ram-jet engine, comprising a nozzle and one pipe connected to said nozzle and supplied with hot liquid fuel under pressure, said nozzle having a divergent part of substantial length with a divergence of a predetermined value opening outside the aircraft and directed in an outer flow of incident air toward the ram-jet engine, the said hot liquid fuel having a pressure above a level which permits the fuel to be vaporized in the said pipe and below a level which permits at least a part of the same to be vaporized by expansion in the said divergent part of predetermined divergence while flowing therethrough, whereby the hot liquid fuel is vaporized in said divergent part at least partially by expansion with formation of a jet which mixes with said flow of incident air to penetrate into the ram-jet engine.

13. In an aircraft, the combination of a wing triangular in cross-section, with a lower surface sloping rearwardly and upwardly to the aircraft and having an edge projecting downwards to define a combustion space below the lower surface to the rear of the edge, at least one burner comprising a nozzle and one pipe connected to said nozzle and supplied with hot liquid fuel under pressure, said nozzle having a divergent part of substantial length with a divergence of a predetermined value opening below the wing in said combustion space, the said hot liquid fuel having a pressure above a level which permits the fuel to be vaporized in the said pipe and below a level which permits at least a part of the same to be vaporized by expansion in the said divergent part of predetermined divergence while flowing therethrough, whereby the hot liquid fuel is vaporized in said divergent part at least partially by expansion with formation of a jet which mixes with a flow of incident air to penetrate into the combustion space, and ignition means in the combustion space, whereby combustion takes place in the combustion space to increase the pressure on said lower surface of the wing, thereby increasing the lift and thrust of the aircraft.

(References on following page)

References Cited in the file of this patent

UNITED STATES PATENTS

| | | |
|---|---|---|
| 1,998,784 | Mock | Apr. 23, 1935 |
| 2,502,332 | McCollum | Mar. 28, 1950 |
| 2,503,973 | Smith | Apr. 11, 1950 |
| 2,541,347 | Eckstien | Feb. 13, 1951 |
| 2,573,834 | Davidson | Nov. 6, 1951 |
| 2,617,252 | Klein | Nov. 11, 1952 |
| 2,663,142 | Wilson | Dec. 22, 1953 |
| 2,718,116 | Moses | Sept. 20, 1955 |
| 2,893,647 | Wortman | July 7, 1959 |
| 2,907,527 | Cummings | Oct. 6, 1959 |
| 2,916,367 | Stokes | Dec. 8, 1959 |
| 2,930,544 | Howell | Mar. 29, 1960 |
| 2,931,175 | Jamison et al. | Apr. 5, 1960 |
| 2,936,969 | Griffith et al. | May 17, 1960 |
| 2,937,501 | Trousse | May 24, 1960 |
| 2,974,475 | Kolfenbach | Mar. 14, 1961 |
| 2,995,317 | Schoppe | Aug. 8, 1961 |
| 3,008,669 | Tanczos | Nov. 14, 1961 |

FOREIGN PATENTS

| | | |
|---|---|---|
| 944,889 | France | Nov. 15, 1948 |